United States Patent [19]

Focht

[11] Patent Number: 4,974,952
[45] Date of Patent: Dec. 4, 1990

[54] LIVE CELL CHAMBER FOR MICROSCOPES

[76] Inventor: Daniel C. Focht, 334 Heist Rd., Butler, Pa. 16001

[21] Appl. No.: 175,989

[22] Filed: Mar. 31, 1988

[51] Int. Cl.$^5$ ............................................. G02B 21/34
[52] U.S. Cl. .................................... 350/536; 356/246
[58] Field of Search ...................... 350/534, 535, 536; 356/244, 245, 246

[56] References Cited

U.S. PATENT DOCUMENTS

| | | | |
|---|---|---|---|
| 2,415,480 | 2/1947 | Gassert | 350/535 |
| 2,660,091 | 11/1953 | McCallum | 350/535 |
| 2,940,360 | 6/1960 | Carter, Jr. | 350/536 |
| 2,942,520 | 6/1960 | Rose | 350/536 |
| 3,503,665 | 3/1970 | Carter | 350/536 |
| 3,591,461 | 7/1971 | Bazil et al. | 350/536 |
| 4,707,086 | 11/1987 | Dahan et al. | 350/536 |

Primary Examiner—Bruce Y. Arnold
Assistant Examiner—Martin Lerner

[57] ABSTRACT

A live cell chamber apparatus (10) comprising a chamber frame unit (11) an upper seal unit (12) a cover slip unit (13) a lower seal unit (14) and a slide unit (15) wherein a fluid infusion chamber (101) is formed between the cover slip unit (13) the lower seal unit (14) and the slide unit (15) wherein the infusion chamber is in fluid communication with fluid ports (19) formed in the chamber frame unit (11).

6 Claims, 4 Drawing Sheets

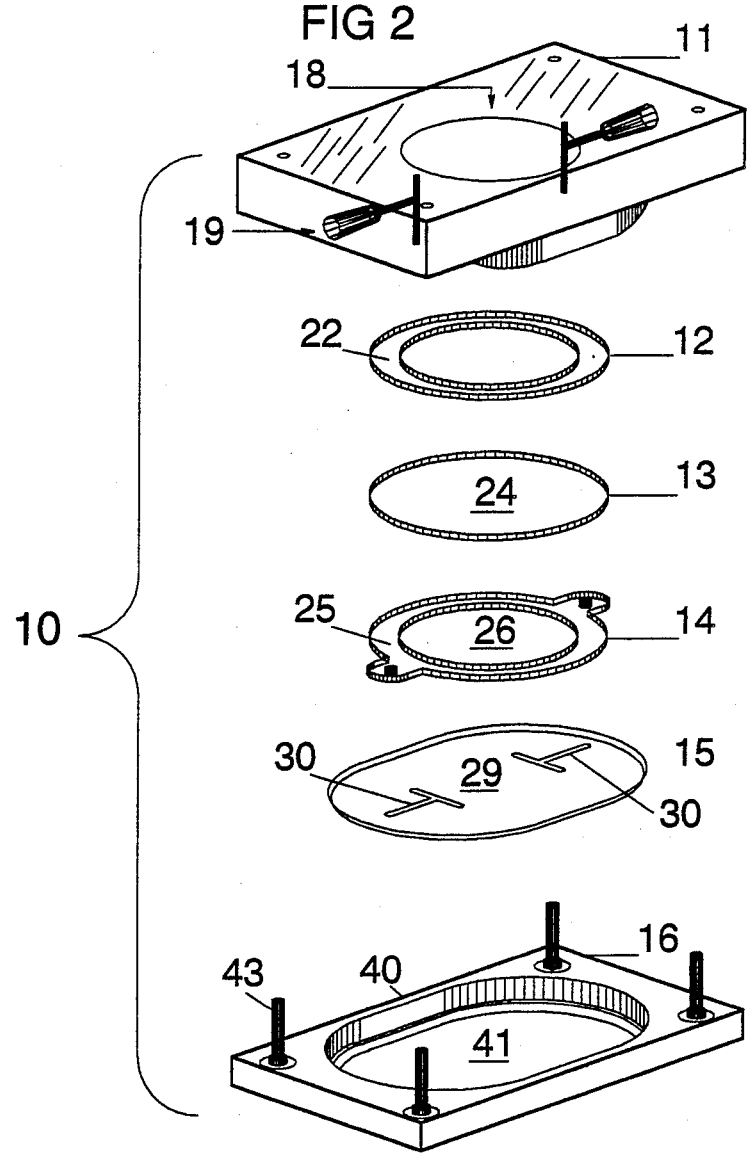

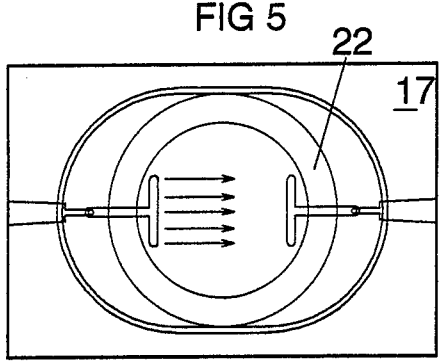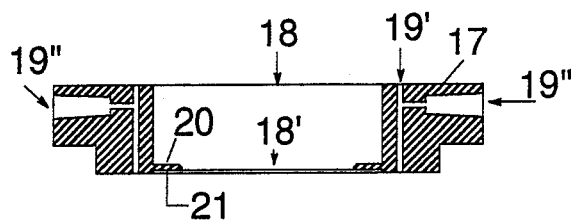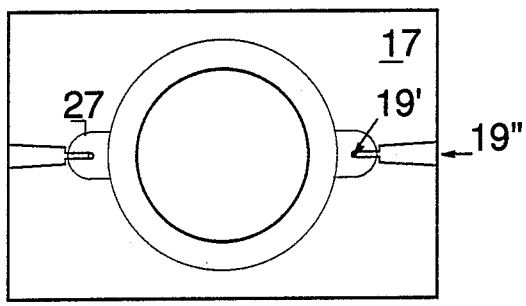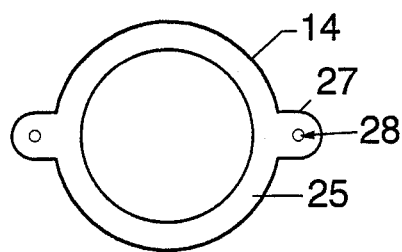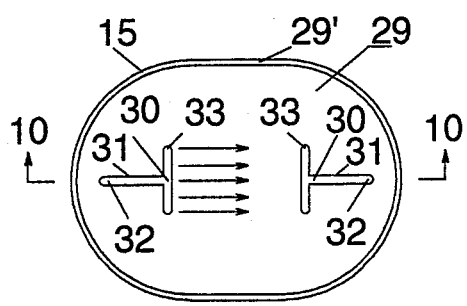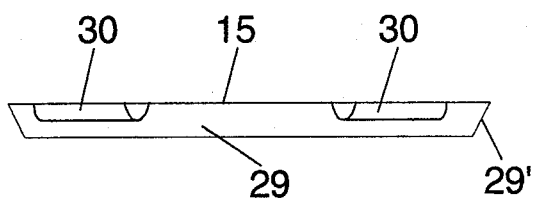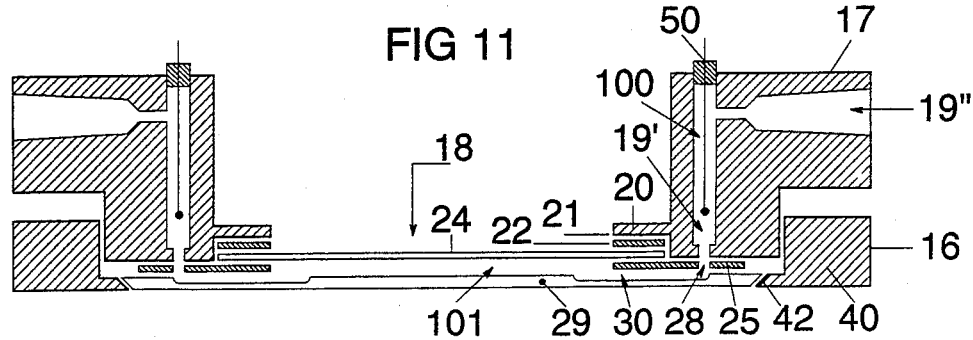

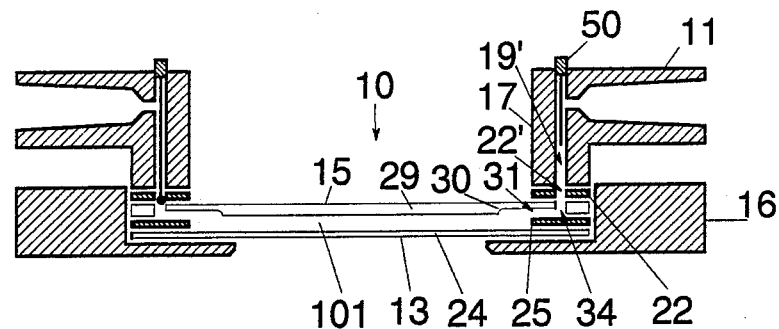

LIVE CELL CHAMBER FOR MICROSCOPES

TECHNICAL FIELD

The present invention relates generally to the field of microscopy and more particularly to a live cell chamber construction for transmitted light microscopes.

BACKGROUND OF THE INVENTION

Previously, live cell chambers such as the Leiden, Sykes-Moore, and Dvorak-Stotler culture chambers were designed primarily for use on an inverted microscope at lower magnifications. These chambers would permit the infusion of liquids onto optical surfaces that due to the presence of a large number of intervening structural components were too far apart from each other and too far away from the stage to obtain the optimum illumination or desired image quality for the most commonly used forms of microscopy such as brightfield, darkfield, phase, DIC, and fluorescence. Another drawback of previous chambers is that the infusion method directed a concentrated stream of liquid across the sample thus washing away the specimen.

As if these problems were not perplexing enough, the older chambers were difficult to load and assemble; not to mention that temperature control was difficult to maintain, and in some cases efforts to control temperature resulted in damage to the microscope optics.

These longstanding problems have continually challenged those people engaged in live cell research. Since nothing else was available on the market that gave the researchers what they wanted, they used whatever was available until the demands of high resolution fluorescent microscopy made it necessary for a new design to handle the requirements of live cell research.

The ideal live cell chamber construction sought by the researchers in fluorescent microscopy would fulfill the following operating parameters: enhanced performance from the microscope; long term life of the cells within a closed system; rapid infusion of the cells into and through the chamber; laminar flow of a preequilibriated medium through the chamber; as well as, a temperature regulation and stabilization of the medium both within the chamber and throughout the closed circuit system.

In addition, all of the structural components of the live cell chamber would have to be nonreactive to biological materials and fit on a standard microscope with an absolute minimum of modification to the original design of the scope. The chamber must also be capable of conducting an ample volume of media in a laminar motion across the specimen without leaking or damaging the cells. The ideal design should further allow for easy care and maintenance of the live cell chamber; as well as, ease of loading of specimens.

From an optical standpoint the live cell chamber must allow the specimen to be viewed using Koehler illumination. The particular spacing and the optical materials employed have to be compatible with standard microscopy; and, the viewing surface has to be large enough to allow room for movement of the chamber when used with large diameter objectives to present the cells in such a way that they can be observed at the highest degree of resolution without damage to the cells.

From a temperature standpoint the live cell chamber temperature has to be able to be regulatable to accommodate the characteristics of different samples. In order to do this the temperature has to be monitored in the media flow region, and once the required temperature has been obtained it also must be stabilized within one tenth of a degree centigrade.

BRIEF SUMMARY OF THE INVENTION

As mentioned previously, the live cell chamber construction that forms the basis of the present invention was developed using the basic principles of Koehler illumination. A typical Koehler illumination array is depicted in the accompanying drawings in FIG. 1 and labeled "PRIOR ART".

In order to achieve an understanding and appreciation of the live cell chamber construction of this invention, it will first be necessary to grasp the basic operation involved in Koehler illumination. To wit, the light rays leaving the light source are directed by the collector lens through the field stop to the condenser. Subsequently the condenser will fill the aperture of the objective with light and simultaneously image the field stop in the same image plane as the specimen on the slide.

The aforementioned arrangement will thus allow the precise alignment of the condenser and provide an evenly illuminated field; wherein, the condenser must be positioned very closely to the specimen to function properly. In addition, the slide and cover slip are considered to be integral parts of the inventive construction; wherein, the cover slip serves as the first lens of the objective.

In order for the live cell chamber of the invention to be compatible with the design of modern microscopes it is necessary to use the slide and cover slip as the two basic integral parts of the chamber. The goals of the present invention are to have the microscope slide make direct contact on the surface of the stage, thus making Koehler illumination possible. For this reason the live cell chamber of this invention was developed around the slide and cover slip rather than making a structurally independent chamber and putting a window in it.

The next step is to place a standard cover slip containing cells on top of the slide and leave room for infusion of the media. In order to infuse the chamber, there must exist a uniform separation of slide and cover slip, as well as, a passageway for the liquid to flow. In this respect, the present chamber is unique because the flow of liquid goes through channels cut into the slide that carries the fluid under a gasket and into the gap separating the cover slip from the slide.

Unlike other chambers, this design enables the slide to rest directly on the surface of the stage and still permit infusion. Laminar flow is established by providing two parallel channels in the slide perpendicular to the incoming and outgoing flow. This allows the fluid in the channel to spread out before it makes its way across the slide.

The benefit of this design is that the effects of a concentrated stream are greatly reduced and the rate of flow is increased as compared to traditional chambers. Due to the fact that the chamber has to be nonreactive to the specimen it is made of surgical stainless steel and the gasket is made of latex or silicone rubber. This serves a dual purpose, the first of which is to provide a rigid frame to attach the slide to; and, the other is to provide a heat sink for temperature regulation. In addition, the steel frame provides a stable mounting for the infusion tubing, as well, as any solid state temperature regulating devices.

Monitoring temperature of the media is accomplished by inserting a thermistor directly into the media just as it enters the chamber. A sealed port is provided for mounting the thermistor in the one millimeter diameter duct, and conventional external electronics will be used to regulate the temperature through the use of a Peltier cell, an electro-resistive heater, or a water bath.

It should also be noted that in as much as there are both upright and inverted microscopes used for a variety of research endeavors, the live cell chamber construction of this invention will have both an upright and an inverted version that will accommodate these two types of microscopes. In fact, while the detailed description of the invention which follows is devoted primarily to the upright version, it should be appreciated that in the tissue culture field the inverted microscope receives widespread usage; and, when microinjection techniques are employed in this area the use of an inverted microscope is an absolute necessity. It should also be noted that when using an inverted microscope it is not necessary for the optical surface of the microscope to have direct contact with the stage.

BRIEF SUMMARY OF THE DRAWINGS

These and other objects, advantages, and novel features of the invention will become apparent from the detailed description of the best mode for carrying out the preferred embodiment of the invention which follows; particularly when considered in conjunction with the accompanying drawings, wherein:

FIG. 2 is an exploded perspective view of the upright version of the live cell chamber construction of this invention;

FIG. 5 is a bottom plan view of the assembled relationship between the infusion slide, the upper seal, the cover slip and the frame of the chamber;

FIG. 6 is a cross-sectional view of the frame of the chamber;

FIG. 7 is a top plan view of the frame of the chamber;

FIG. 8 is a top plan view of the lower seal;

FIG. 9 is a top plan view of the infusion slide;

FIG. 10 is a cross-sectional view of the infusion slide taken through line 10—10 of FIG. 9;

FIG. 11 is a detailed cross-sectional view of one side of the live cell chamber in its completely assembled mode; and, FIG. 12 is a cross-sectional view of the inverted version of the live cell chamber construction of this invention.

BEST MODE FOR CARRYING OUT THE INVENTION

Figure 1:
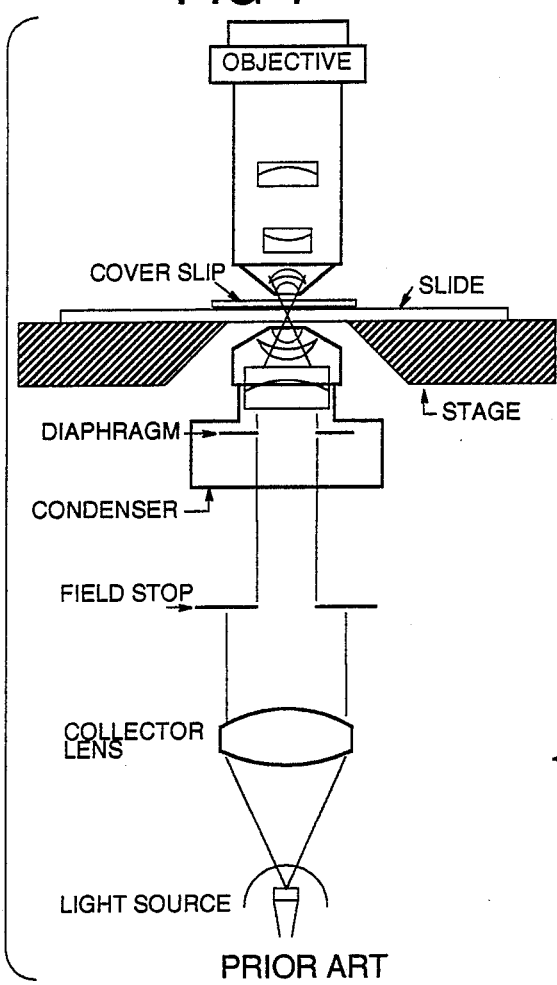
FIG. 1 is a schematic view illustrating the principles of Koehler illumination.

As can be seen by reference to the drawings and in particular to FIG. 2, the upright version of the live cell chamber apparatus that forms the basis of the present invention is designated generally by the reference numeral (10). The live cell chamber apparatus (10) comprises in general: a chamber frame unit (11); an upper seal unit (12); a cover plate unit (13); a lower seal unit (14); an infusion slide unit (15); and, a support plate unit (16). These units will now be described in seriatim fashion.

As shown in FIGS. 2, and 5 thru 7, the chamber frame unit (11) comprises a generally rectangular frame member (17) preferably fabricated from stainless steel and having an enlarged central aperture (18) and a plurality of fluid ports (19). As can best be seen by reference to FIGS. 6 and 7, the central aperture (18) is defined by an enlarged cylindrical opening extending down to a ledge (20); wherein, the ledge (20) is thick enough to give support to the cover plate unit (13) but thin enough to permit the movement of a microscope objective (not shown) located a fraction of a millimeter from the cover plate unit (13) and wherein a generally circular shallow recess (21) is formed in the bottom of the ledge (20) adjacent to, and in a surrounding relationship with the reduced diameter lower aperture opening (18').

In addition, the fluid ports (19) comprise a pair of opposed intersecting vertical (19') and horizontal (19'') fluid ports disposed on opposite sides of the frame member (17); wherein the vertical ports (19'') extend completely through the frame member (17); and, wherein the horizontal ports (19'') extend from the sides of the frame member (17) to a point of intersection with the vertical ports (19') whereby the respective horizontal and vertical fluid ports (19'', 19') on each side of the frame member (17) will be in open fluid communication with one another.

As shown in FIGS. 2 and 5, the upper seal unit (12) comprises a first generally circular thin resilient upper gasket member (22) preferably fabricated from an inert material such as rubber, or silastic sheeting; wherein, the upper gasket member (22) is dimensioned to be received in the shallow recess (21) formed in the bottom of the ledge (20) of the chamber frame member (17). In addition, the upper gasket member (22) is provided with a central aperture (26) whose diameter is approximately equal to, but greater than, the diameter of the reduced diameter lower aperture opening (18') in the chamber frame member (17).

As can be seen by reference to FIG. 2, the cover slip unit (13) comprises a thin transparent disc member (24) which is dimensioned to be received within the shallow recess (21) in the chamber frame member (17); wherein, the upper gasket member (22) is disposed in an intermediate fluid tight sealing relationship between the disc member (24) and the chamber frame member (17).

Turning now to FIGS. 2, 7, and 8, it can be seen that the lower seal unit (14) comprises a second generally circular thin resilient lower gasket member (25) preferably fabricated from an inert material such as rubber, or silastic material. In addition, the lower gasket member (25) is further provided with an enlarged central aperture (26) and a pair of opposed outwardly projecting ear portions (27); wherein, each of the ear portions (27) are provided with a discrete fluid aperture (28) which are dimensioned to coincide and disposed in alignment with the vertical fluid ports (19') in the chamber frame (17); and, wherein the enlarged central aperture (26) is generally disposed in alignment with the central aperture (23) in the first upper gasket member (22).

As shown in FIGS. 2, 9, and 10, the infusion slide unit (15) comprises an enlarged generally elliptical transparent slide member (29) fabricated from an inert material such as glass or the like, and having beveled edges (29') formed on the outer periphery of the slide member (29) and a plurality of opposed shallow fluid infusion grooves (30) formed on the top surface of the slide member (29) such as by etching, or the like.

The fluid infusion grooves (30) comprise generally T-shaped mirror image micro-channels (31) which are spaced from one another and disposed such that the stems (32) of the T-shaped micro-channels (31) are axially aligned with one another, while the tops (33) of the T-shaped micro-channels (31) are disposed in a parallel relationship to one another.

Figure 3:
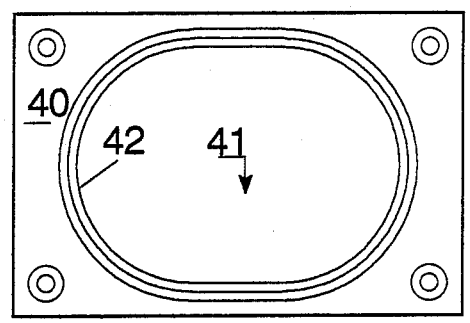
FIG. 3 is a top plan view of the slide support plate.
Figure 4:
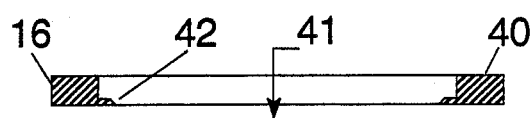
FIG. 4 is a cross-sectional view of the slide support plate taken thru line 4—4 of FIG. 3.

As can be seen by reference to FIGS. 2 thru 4, and 10, the support plate unit (16) comprises a generally rectangular rigid support plate member (40) preferably fabricated from stainless steel, and having an enlarged generally eliptical central aperture (41) formed therein; wherein, the central aperture (41) is defined by inwardly beveled side walls (42); which are dimensioned to intimately engage the beveled edges (29') of the slide member (29). In addition, the support plate member (40) is further provided with securing means (43) which are adapted to operatively engage the support plate member (40) with the chamber frame member (17) to complete the assembly of the live cell chamber apparatus (10) of this invention.

As can best be seen by reference to FIG. 11, when the live cell chamber apparatus (10) is in its assembled mode a fluid passageway (100) is created through the apparatus (10) once thermistor elements (50) have been sealingly disposed in the top portion of the vertical fluid ports (19'). Since both sides of the apparatus (10) are mirror images of one another only that portion of the apparatus (10) depicted in FIG. 11 will be necessary for the purposes of discussion.

The fluid passageway (100) comprises in general: the horizontal fluid port (19''); the vertical fluid port (19'); the fluid aperture (28) in the lower sealing gasket member (25); the fluid infusion groove (30) in the slide member (29); and the infusion chamber (101) which is defined by the bottom of the cover slip unit disc member (24); the top of the slide member (29) and the periphery of the lower sealing gasket member (25); wherein, the thickness of the lower gasket member (25) defines both the depth and the volume of the fluid infusion chamber.

At this point it should be appreciated that one of the horizontal fluid ports (19'') will serve as the inlet and the other horizontal fluid port (19'') will serve as the outlet for a fluid culture medium that will be transferred across the infusion chamber (101). It should also be appreciated that the relative dimensioning and configuration of the infusion grooves (30) will produce a laminar flow across the infusion chamber (101) as indicated by the flow arrows depicted in FIGS. 5 and 9.

As mentioned earlier on in the specification, the prior art live cell chamber devices have all experienced difficulty in establishing a large volume flow rate of the culture medium across the live cell chamber. To wit, in the Dvorak-Stotler live cell chamber the nominal flow rate of the culture medium with a perfusion pump amounts to 1 cc per hour.

However, in one prototype of the live cell chamber apparatus of this invention a culture medium flow rate of 6 cc per minute was established. This flow rate was accomplished with the following dimensioning of the fluid passageway: vertical port (19') and lower gasket aperture (28) having a diameter of 1 MM wherein the T-shaped channels had a 0.5 MM radial depth and a width of 1 MM; wherein, the stem (32) of the channels (31) had a length of 13 MM; the top (33) of the channels had a length of 17 MM; and, the spacing between the tops of the channels was 25 MM. It should also be noted that the horizontal fluid ports (19'') are provided with a luer taper to facilitate connection of the chamber construction (10) to conventional laboratory tubing connectors (not shown) whereby the culture medium may be introduced in a laminar flow across the infusion chamber (101); which in the aforementioned example had a depth or lower gasket thickness of 0.15 MM.

The following table represents the results produced by employing lower gasket thicknesses ranging from 0.15 MM to 0.45 MM.

| CAPACITY | A | B | C |
|---|---|---|---|
| INTERNAL THICKNESS | .15 MM | .30 MM | .45 MM |
| INTERNAL DIAMETER | 30 MM | 30 MM | 30 MM |
| INTERNAL VOLUME | 106 MM$^3$ | 212 MM$^3$ | 318 MM$^3$ |
| OPTICAL PATH | 1.55 MM | 1.7 MM | 1.85 MM |
| DISTANCE FROM STAGE TO SLIDE | 0 | 0 | 0 |
| FLOW RATE WITH 100 MM H$_2$O COLUMN | .1 ml/SEC | .1 ml/SEC | .1 ml/SEC |
| COMPLETE MEDIA EXCHANGE | 2 SEC | 4 SEC | 6 SEC |
| MICRO AQUEDUCT CROSS-SECTIONAL AREA | | .4 MM$^2$ | |
| COVER GLASS | 40 MM DIA | | |
| | .15 MM–.17 MM THICK | | |
| EXTERNAL SIZE | 50 MM × 75 MM × 15 MM | | |
| TUBING CONNECTION | LUER SYRINGE TAPER | | |
| TEMPERATURE CONTROL | MICROPROCESSOR CONTROLLED PELTIER EFFECT OR ELECTRO-RESISTIVE HEATING | | |
| TEMPERATURE SENSOR | THERMISTOR | | |
| NO. OF PIECES TO ASSEMBLE | 6 | | |

As was also mentioned previously this invention also contemplates the infusion of a preequilibriated culture medium across the apparatus (10), and to that end the thermistors (50) are positioned at both the inlet and outlet of the chamber fluid ports (10) whereby conventional external electronics (not shown) may be employed to heat the chamber frame (17) directly through the use of either a Peltier cell or water bath.

Turning now to FIG. 12, it can be seen that in the inverted version of the live cell chamber apparatus (10), the relative positioning of the cover plate unit (13) and the infusion slide unit (15) have been reversed relative to one another and the chamber frame unit (11). In addition, the slide member (29) has the fluid infusion grooves (30) formed on the bottom surface of the slide member (29).

As was the case with the upright version, the fluid infusion grooves (30) of the inverted version comprise mirror image generally T-shaped micro-channels (31) which are spaced from one another and disposed such that the stems (32) of the micro-channels (31) are axially aligned. In addition, in the inverted version a pair of vertically disposed micro-aqueducts (34) are provided in the slide member (29) to intersect with the stems (32) of the micro-channels (31), to permit the flow of a culture medium through the slide member (29).

It can also be appreciated by reference to FIG. 12, that the upper gasket member (22) is now provided with discrete apertures (22') which are aligned with the vertical ports (19') on the opposite sides of the frame member (17) to permit the flow of culture medium through the infusion chamber (101). In addition, the support plate unit (16) now forms a support surface for the cover plate unit (13) in the inverted orientation.

Having thereby described the subject matter of the invention it should be obvious that many substitutions, modifications and variations, particularly with respect to dimensions, may be made in keeping with the above teachings. It is therefore to be understood that the invention as taught and described herein is only to be limited to the extent of the breadth and scope of the appended claims.

I claim:

1. A live cell chamber apparatus for studying a live fluid culture medium with a microscope wherein the apparatus comprises:

a chamber frame unit provided with fluid apertures;

an upper seal unit operatively engaging said chamber frame unit;

a cover slip unit operatively associated with said chamber frame unit;

an infusion slide unit operatively associated with the cover slip unit;

a lower gasket unit operatively disposed intermediate said cover slip unit and said infusion slide unit; and, an infusion chamber formed between the cover slip unit; the lower gasket unit; and the infusion slide unit wherein the infusion chamber is in fluid communication with the fluid apertures in said chamber frame unit; wherein, there are a plurality of infusion grooves formed in the infusion slide unit, and a plurality of micro-aqueducts formed through the infusion slide unit and through the lower gasket unit and/or upper seal unit.

2. The apparatus as in claim 1 wherein the infusion grooves comprise micro-channels.

3. The apparatus as in claim 2 wherein the micro-channels have a generally T-shaped configuration to promote generally laminar flow of a fluid medium across the slide member.

4. The apparatus as in claim 3 wherein the upper seal unit comprises a gasket member.

5. The apparatus as in claim 4 wherein the infusion grooves are formed on the top surface of said slide member, and wherein the said micro-aqueducts are formed in the lower gasket unit.

6. The apparatus as in claim 1 wherein the infusion grooves are formed on the bottom surface of said slide member, and wherein the micro-aqueducts are formed in the upper seal unit.

* * * * *